United States Patent
Sugiyama et al.

(10) Patent No.: US 9,651,804 B2
(45) Date of Patent: May 16, 2017

(54) OPTICAL MODULE

(71) Applicant: Fujitsu Optical Components Limited, Kawasaki-shi, Kanagawa (JP)

(72) Inventors: Masaki Sugiyama, Sagamihara (JP); Akira Ishii, Yokohama (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/943,736

(22) Filed: Nov. 17, 2015

(65) Prior Publication Data
US 2016/0161771 A1 Jun. 9, 2016

(30) Foreign Application Priority Data

Dec. 8, 2014 (JP) .................. 2014-248445

(51) Int. Cl.
*G02F 1/03* (2006.01)
*G02F 1/225* (2006.01)
*G02F 1/035* (2006.01)
*G02B 6/42* (2006.01)

(52) U.S. Cl.
CPC ......... *G02F 1/0316* (2013.01); *G02B 6/4201* (2013.01); *G02F 1/035* (2013.01); *G02F 1/225* (2013.01)

(58) Field of Classification Search
CPC ............... G02F 1/03; G02F 1/01; G02F 1/225

USPC .................................................. 385/3
See application file for complete search history.

(56) References Cited

U.S. PATENT DOCUMENTS

| | | | | |
|---|---|---|---|---|
| 6,181,718 | B1 * | 1/2001 | Kobayashi et al. | 372/34 |
| 8,428,399 | B2 * | 4/2013 | Takabayashi | 385/2 |
| 2003/0147575 | A1 * | 8/2003 | Sugiyama et al. | 385/2 |
| 2004/0264835 | A1 * | 12/2004 | Matsushima et al. | 385/14 |
| 2005/0121684 | A1 * | 6/2005 | Aruga et al. | 257/99 |
| 2005/0213863 | A1 * | 9/2005 | Sugiyama et al. | 385/2 |
| 2005/0213882 | A1 * | 9/2005 | Go et al. | 385/37 |
| 2006/0029319 | A1 * | 2/2006 | Sugiyama | 385/1 |
| 2012/0051683 | A1 * | 3/2012 | Sugiyama | 385/1 |

FOREIGN PATENT DOCUMENTS

| | | |
|---|---|---|
| JP | 2012-47823 | 3/2012 |
| JP | 2012-48121 | 3/2012 |

* cited by examiner

*Primary Examiner* — Kaveh C Kianni

(57) ABSTRACT

An optical module includes a package, a substrate, a lead pin, and a ground pattern. The substrate is accommodated in the package, includes a signal line pattern that transmits an electric signal, extends toward a side wall of the package beyond an end of the signal line pattern, and has a through hole between the end of the signal line pattern and the side wall of the package. The lead pin is inserted into the through hole in the substrate and inputs the electric signal to the end of the signal line pattern. The ground pattern is provided in at least a part of regions surrounding the through hole on the substrate.

3 Claims, 6 Drawing Sheets

OPTICAL MODULE

CROSS-REFERENCE TO RELATED APPLICATION

This application is based upon and claims the benefit of priority of the prior Japanese Patent Application No. 2014-248445, filed on Dec. 8, 2014, the entire contents of which are incorporated herein by reference.

FIELD

The embodiments discussed herein are directed to an optical module.

BACKGROUND

Optical modules such as optical modulators have been focusing on high-speed modulation rates and large-scale configuration in accordance with an increase in transmission capacity of recent optical transmission systems. Such an optical module, when installed in an optical transmitter, is desirably smaller in size by integrating a plurality of Mach-Zehnder configurations forming an optical waveguide on one chip. The optical module includes, for example, four Mach-Zehnder configurations that form parallel optical waveguide arms. On each pair of optical waveguide arms, two signal electrodes and two ground electrodes are patterned. The optical module inputs different electric signals to the two signal electrodes to generate multi-level modulation signals. The optical module having such a configuration includes input parts to which electric signals are input, and all the input parts are disposed at one side of a package to facilitate mounting and to minimize their footprint.

Such an optical module having input parts disposed on one side of a package receives electric signals such as radio frequency (RF) signals via coaxial connectors provided on a side wall of the package. The coaxial connectors are connected with coaxial adopters through which external electric signals are input. With this configuration, the optical module needs a wider interval between the signal electrodes to which electric signals are input to allow the coaxial adopters having a certain width to fit in. When the number of channels is increased, the optical module needs a larger footprint for the input parts.

To reduce such footprint, a surface-mounting optical module has been developed that receives electric signals from a printed circuit board (PCB) via a flexible printed circuit (FPC) provided to the package. In such an optical module, the FPC, an end of which is soldered to the PCB, extends along the longitudinal direction of the package, and is electrically connected with signal electrodes on an optical waveguide via a relay substrate accommodated in the package to input electric signals. In the optical module, signal line patterns on the relay substrate are electrically connected with the FPC via lead pins of glass terminals embedded in the package. Electric signals such as RF signals input from the PCB to the FPC first reach the lead pins via the FPC and then are input to the signal line patterns on the relay substrate. Passing through the signal line patterns on the relay substrate, the electric signals reach the signal electrodes on the optical waveguide. This configuration eliminates the coaxial adopters and reduces the interval between the signal electrodes to which electric signals are input, whereby the footprint of the input parts can be reduced. Consequently, the optical transmitter can be reduced in size.

Conventional technologies are described in Japanese Laid-open Patent Publication No. 2012-48121, for example.

A gap is formed between the lead pins of the glass terminals embedded in the package and a side wall of the package. When the distance across the gap between the lead pins and the side wall of the package corresponds to a certain distance, resonance occurs between the lead pins and the side wall of the package. In particular, an optical module such as an optical modulator dealing with high-frequency signals suffers disturbance of electric field distribution of high-frequency signals caused by the resonance between the lead pins and the side wall of the package described above, resulting in degradation of the high-frequency characteristics.

SUMMARY

According to an aspect of an embodiment, an optical module includes a package; a first substrate that is accommodated in the package, includes a signal line pattern that transmits an electric signal, extends toward a side wall of the package beyond a first end of the signal line pattern, and has a first through hole formed between the first end of the signal line pattern and the side wall of the package; a lead pin that is inserted into the first through hole in the first substrate and inputs the electric signal to the first end of the signal line pattern; and a ground pattern that is provided in at least a part of regions surrounding the first through hole on the first substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are not intended to limit the scope of the present invention.

[a] First Embodiment

Figure 1:
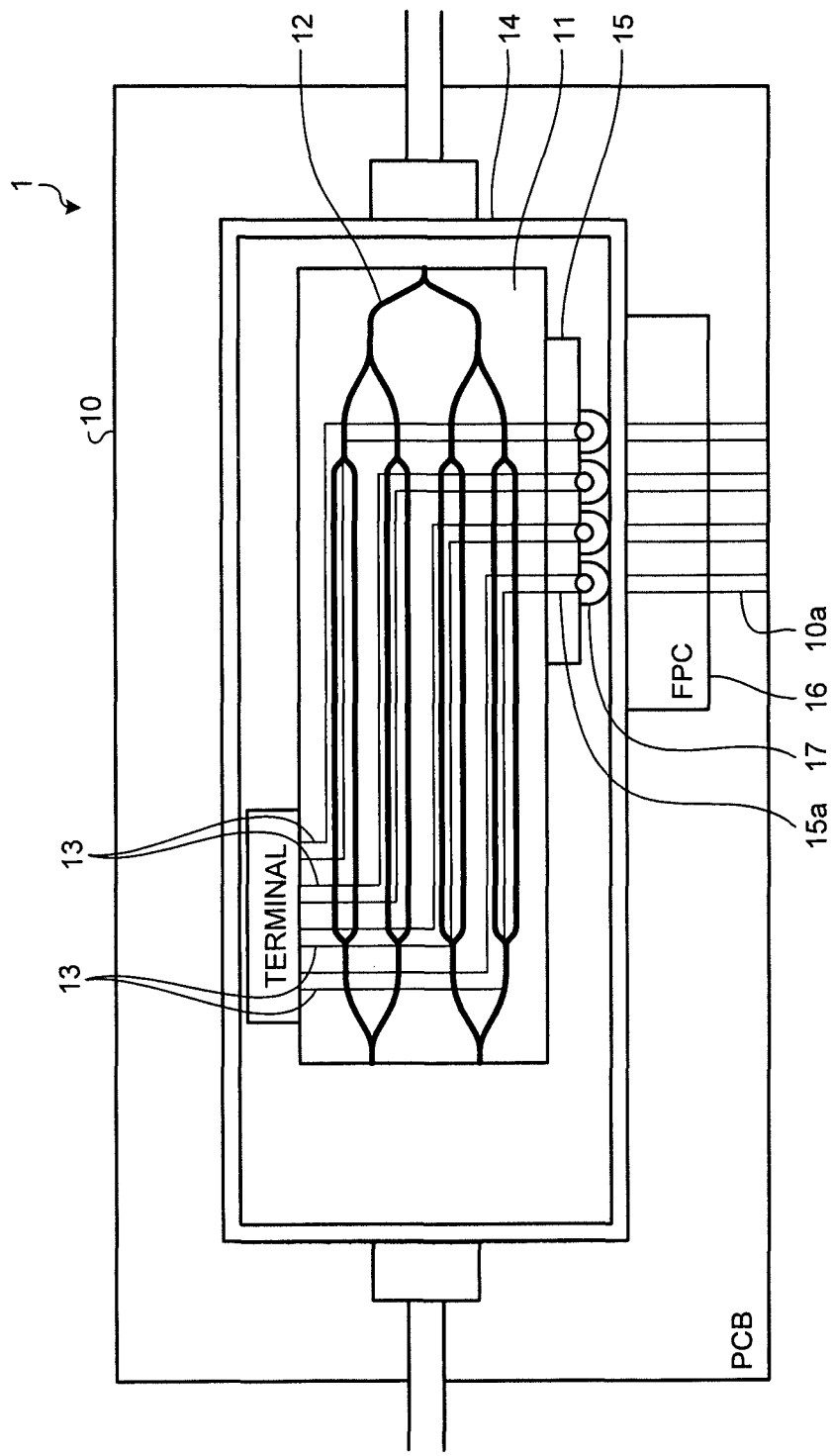
FIG. 1 is a top view illustrating a configuration of an optical module according to a conventional technology.

Described first is a conventional technology on which an optical module according to a first embodiment of the present invention is based. FIG. 1 is a top view illustrating a configuration of an optical module according to the conventional technology. As illustrated in FIG. 1, an optical module 1 is fabricated such that a crystal substrate 11 is mounted on a PCB 10, and electrodes 13 are provided close to an optical waveguide 12 formed on the crystal substrate 11. The PCB 10 is, for example, a glass epoxy substrate, on which various components constituting the optical module 1 are mounted. The crystal substrate 11 is made of an electro-optic crystal such as $LiNbO_3$ (LN) or $LiTaO_3$. The optical waveguide 12 is formed in such a manner that a metal film made of, for example, titanium is deposited and thermally diffused, or is formed by proton exchange under benzoic acid after patterning. The optical waveguide 12 constitutes a Mach-Zehnder interferometer system, and the electrodes 13 are provided on the parallel waveguide arms having the Mach-Zehnder configuration.

The electrodes 13 are disposed immediately above the optical waveguide 12 so that the electric field in the z-axis direction changes the refractive index of the optical waveguide 12. The electrodes 13 are coplanar electrodes formed by signal electrodes and ground electrodes patterned on the optical waveguide 12. The optical module 1 includes a buffer layer between the crystal substrate 11 and the electrodes 13 to prevent the light that is propagated within the optical waveguide 12 from being absorbed in the signal electrodes or the ground electrodes. The buffer layer is made of, for example, $SiO_2$ being about 0.2 to 2 μm thick.

To drive the optical module 1 at high speed, ends of the signal electrodes and the ground electrodes are connected to a resistor to form a traveling wave electrode, and microwave signals are applied to the electrode from an input part. With the application of microwave signals, the refractive indices of two arms of the optical waveguide 12 constituting a Mach-Zehnder configuration are changed by $+\Delta na$ and $-\Delta nb$, respectively, and the phase difference between the arms of the optical waveguide 12 is changed, accordingly. As a result, phase-modulated signal light modulated by the Mach-Zehnder interference effect is output from the optical waveguide 12. The optical module 1 controls the effective refractive index of the microwaves by changing cross-sectional shapes of the electrodes 13 to match the speeds of the light and the microwaves, thereby obtaining high-speed optical response characteristics.

In the optical module 1, as illustrated in FIG. 1, an FPC 16 is provided, via a relay substrate 15, to a package 14 that accommodates the crystal substrate 11, the optical waveguide 12, the electrodes 13, and the relay substrate 15. The FPC 16, a first edge of which is soldered to the PCB 10, extends along the longitudinal direction of the package 14 and is electrically connected with the electrodes 13 on the optical waveguide 12 via the relay substrate 15 accommo-dated in the package 14. In the optical module 1, signal line patterns 15a on the relay substrate 15 are electrically connected with the FPC 16 via lead pins of glass terminals 17 embedded in the package 14.

Electric signals such as RF signals input from the PCB 10 to the FPC 16 are input to the signal line patterns 15a on the relay substrate 15 via the lead pins of the glass terminals 17 embedded in the package 14. The relay substrate 15 is electrically connected with the FPC 16 by the lead pins. This configuration can narrow the intervals between the signal line patterns 15a on the relay substrate 15 compared to a case in which coaxial adopters are used, thereby enabling high density mounting on a connection part between the relay substrate 15 and the FPC 16.

Figure 2:
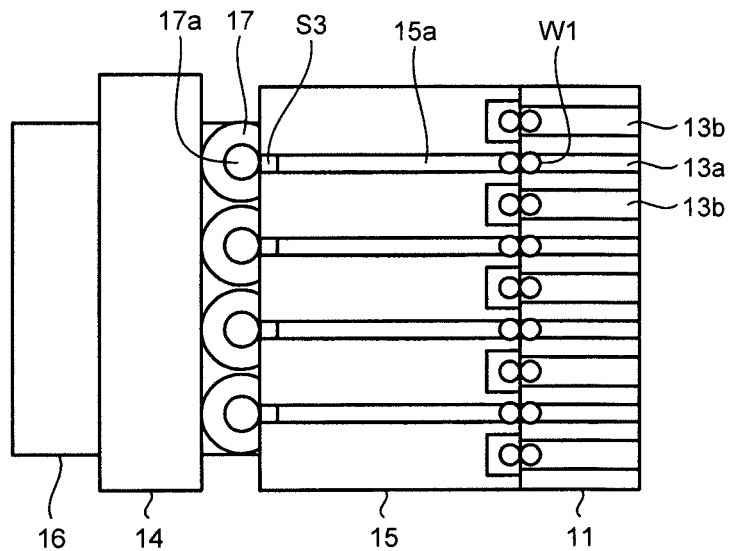
FIG. 2 is an enlarged top view illustrating an example of a connection part between a relay substrate and an FPC according to the conventional technology.
Figure 3:
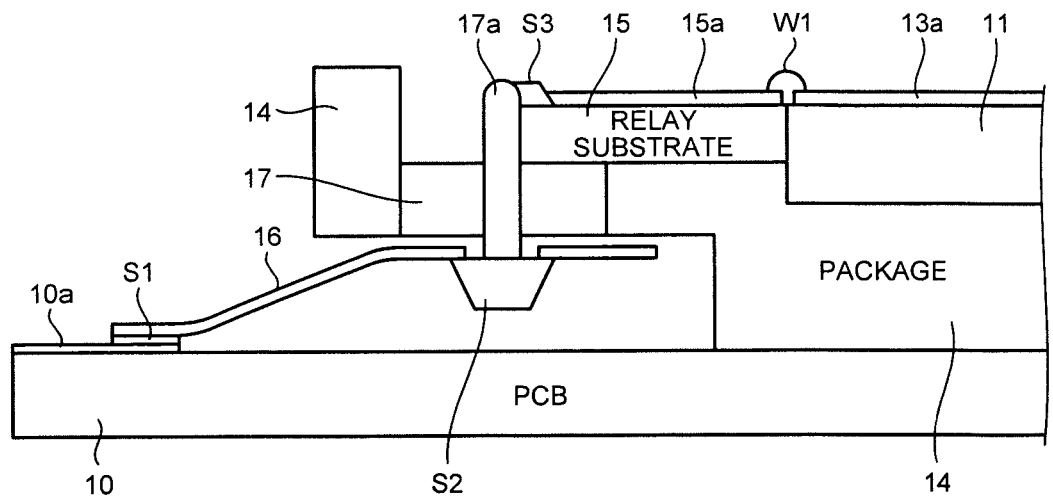
FIG. 3 is an enlarged cross-sectional view illustrating an example of the connection part between the relay substrate and the FPC according to the conventional technology.

FIG. 2 is an enlarged top view illustrating an example of the connection part between the relay substrate 15 and the FPC 16 according to the conventional technology. FIG. 3 is an enlarged cross-sectional view illustrating an example of the connection part between the relay substrate 15 and the FPC 16 according to the conventional technology. As illustrated in FIGS. 2 and 3, electrode patterns 10a on the PCB 10 are connected to the first edge of the FPC 16 by solder S1. The FPC 16 extends along the longitudinal direction of the package 14. The relay substrate 15 is accommodated in the package 14, and includes the signal line patterns 15a. An end of each signal line pattern 15a is connected to a signal electrode 13a, out of signal electrodes 13a and ground electrodes 13b included in the electrodes 13, by a wire W1. The signal line patterns 15a extend to an edge of the relay substrate 15 that faces a side wall of the package 14. The other end of each signal line pattern 15a is connected to a second edge of the FPC 16 by a lead pin 17a of a glass terminal 17 embedded in the package 14 and by solder S2 and S3. The signal line patterns 15a are electrically connected with the FPC 16 via the lead pins 17a of the glass terminals 17 embedded in the package 14. With this configuration, electric signals such as RF signals input from the PCB 10 to the FPC 16 pass through the FPC 16 to the lead pins 17a, and then, are input to the signal line patterns 15a on the relay substrate 15. Passing through the signal line patterns 15a, the electric signals reach the signal electrodes 13a.

Described here is a problem in the connection part between the relay substrate 15 and the FPC 16 illustrated in FIGS. 2 and 3. In the connection part illustrated in FIGS. 2 and 3, a gap is formed between the lead pins 17a of the glass terminals 17 embedded in the package 14 and the side wall of the package 14. Such a gap formed between the lead pins 17a and the side wall of the package 14 causes, depending on the distance across the gap, resonance between the lead pins 17a and the side wall of the package 14 in some cases. When, for example, the distance across the gap formed between the lead pins 17a and the side wall of the package 14 matches a distance corresponding to the resonance frequency of the electric signals such as RF signals that pass through the lead pins 17a, resonance occurs between the lead pins 17a and the side wall of the package 14 in some cases. Such resonance may disturb electric field distribution of the electric signals such as RF signals that pass through the lead pins 17a. Such disturbance in the electric field distribution of the electric signals may cause degradation of high-frequency characteristics. To prevent degradation of high-frequency characteristics caused by such resonance, an optical module according to the first embodiment has a devised configuration of the connection part between the relay substrate and the FPC.

Described next is the optical module according to the first embodiment. The optical module according to the first embodiment has the same configuration as that of the optical module 1 according to the conventional technology, except for the configuration of the connection part between the relay substrate and the FPC. Thus, in the first embodiment, the same reference signs are given to the same constituent elements as those in the conventional technology, and the detailed explanations thereof are omitted.

Figure 4:
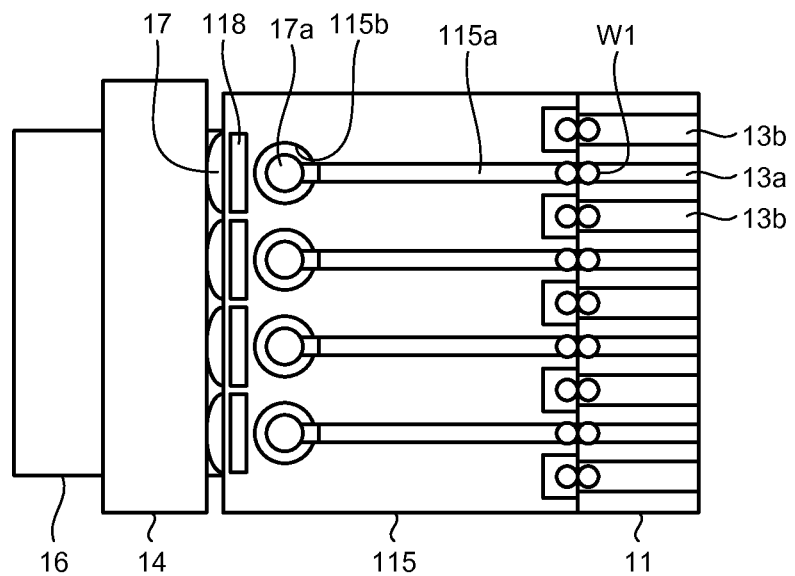
FIG. 4 is an enlarged top view illustrating an example of a connection part between a relay substrate and an FPC according to a first embodiment of the present invention.
Figure 5:
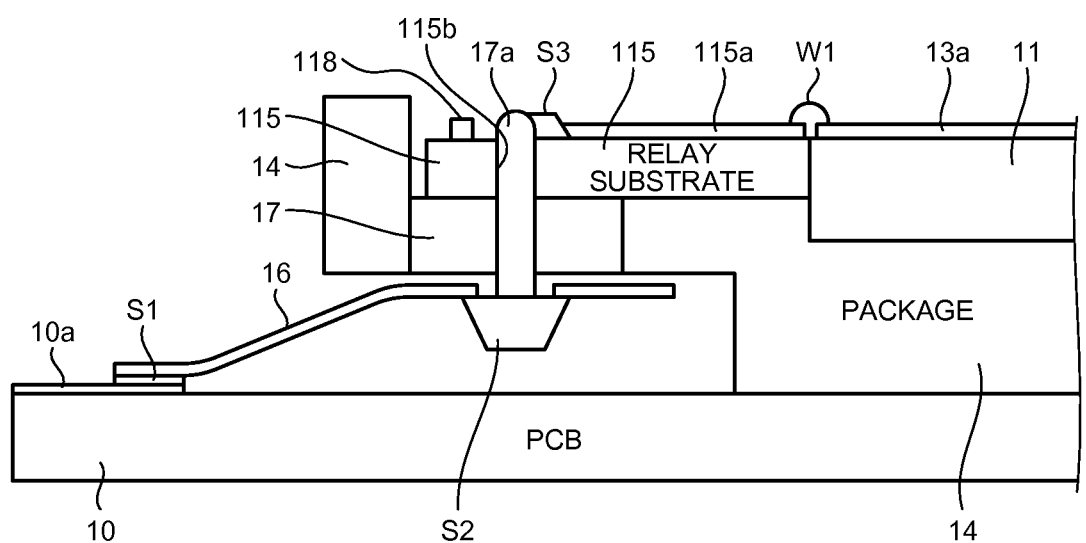
FIG. 5 is an enlarged cross-sectional view illustrating an example of the connection part between the relay substrate and the FPC according to the first embodiment.

FIG. 4 is an enlarged top view illustrating an example of a connection part between a relay substrate 115 and the FPC 16 according to the first embodiment. FIG. 5 is an enlarged cross-sectional view illustrating an example of the connection part between the relay substrate 115 and the FPC 16 according to the first embodiment. As illustrated in FIGS. 4 and 5, the relay substrate 115 is accommodated in the package 14, and includes signal line patterns 115a. An end of each signal line pattern 115a is connected with a signal electrode 13a, out of the signal electrodes 13a and the ground electrodes 13b included in the electrodes 13, by the wire W1. The other end of the signal line pattern 115a opposite to the end to which the signal electrode 13a is connected does not reach the edge of the relay substrate 115 that faces the side wall of the package 14. In other words, the relay substrate 115 extends toward the side wall of the package 14 beyond the other ends of the signal line patterns 115a opposite to the ends thereof to which the signal electrodes 13a are connected. In the following description, the other ends of the signal line patterns 115a opposite to the ends thereof to which the signal electrodes 13a are connected are referred to as "first ends of the signal line patterns 115a".

The relay substrate 115 has first through holes 115b between the first ends of the signal line patterns 115a and the side wall of the package 14. The lead pins 17a of the glass terminals 17 embedded in the package 14 are inserted into the respective first through holes 115b in the relay substrate 115. The first ends of the signal line patterns 115a are connected with the second edge of the FPC 16 away from the solder S1 by the lead pins 17a inserted into the respective first through holes 115b in the relay substrate 115 and by the solder S2 and S3. In other words, the signal line patterns 115a are electrically connected with the FPC 16 via the lead pins 17a inserted into the respective first through holes 115b in the relay substrate 115. With this configuration, electric signals such as RF signals input from the PCB 10 to the FPC 16 pass through the FPC 16 to the lead pins 17a, and then are input to the signal line patterns 115a on the relay substrate 115. Passing through the signal line patterns 115a, the electric signals reach the signal electrodes 13a.

As illustrated in FIGS. 4 and 5, at least a part of regions surrounding a first through hole 115b on the relay substrate 115 is provided with a ground pattern 118. Specifically, the ground pattern 118 is provided in a region, out of regions surrounding the first through hole 115b on the relay substrate 115, between a lead pin 17a and the side wall of the package 14. The length of the ground pattern 118 is longer than the diameter of the lead pin 17a. In other words, the optical module 1 according to the conventional technology does not include ground patterns 118 between the lead pins 17a and the side wall of the package 14. Thus, resonance may possibly occur between the lead pins 17a and the side wall of the package 14. Such resonance, if any, may disturb the electric field distribution of the electric signals such as RF signals passing through the lead pins 17a, which may cause degradation of high-frequency characteristics.

The optical module according to the first embodiment, however, is provided with the ground patterns 118, the length of which is longer than the diameter of the lead pins 17a, disposed in regions, out of the regions surrounding the first through holes 115b on the relay substrate 115, between the lead pins 17a and the side wall of the package 14. With this configuration, the ground patterns 118 divide the lead pins 17a from the side wall of the package 14. Thus, when electric signals such as RF signals pass through the lead pins 17a, no resonance occurs between the lead pins 17a and the side wall of the package 14. The ground patterns 118 also prevent expansion of electric field distribution of the electric signals such as RF signals passing through the lead pins 17a. This configuration prevents disturbance of the electric field distribution of the electric signals such as RF signals passing through the lead pins 17a, and thus prevents degradation of high-frequency characteristics.

Although FIGS. 4 and 5 illustrate an example in which the ground patterns 118 are provided intermittently in regions, out of the regions surrounding the first through holes 115b on the relay substrate 115, between the lead pins 17a and the side wall of the package 14, the present disclosure is not limited to this. For example, ground patterns 118 adjacent to each other may continuously be joined together.

As described above, the optical module according to the first embodiment includes the package 14, the relay substrate 115, the lead pins 17a, and the ground patterns 118. The relay substrate 115 is a first substrate accommodated in the package 14. The relay substrate 115 includes the signal line patterns 115a that transmit electric signals, and extends toward a side wall of the package 14 beyond the first ends of the signal line patterns 115a. The relay substrate 115 has the first through holes 115b formed between the first ends of the signal line patterns 115a and the side wall of the package 14. The lead pins 17a are inserted into the respective first through holes 115b in the relay substrate 115 to input electric signals to the first ends of the signal line patterns 115a. The ground patterns 118 are each provided in at least a part of regions surrounding a first through hole 115b on the relay substrate 115. This configuration can prevent resonance between the lead pins 17a and the side wall of the package 14, thereby preventing disturbance of electric field distribution of the electric signals such as RF signals passing through the lead pins 17a. Consequently, degradation of high-frequency characteristics caused by the resonance between the lead pins 17a and the side wall of the package 14 can be prevented.

In the optical module according to the first embodiment, the ground patterns 118 are each provided in a region, out of the regions surrounding a first through hole 115b on the relay substrate 115, between a lead pin 17a and the side wall of the package 14. This configuration can prevent electric field distribution of the electric signals such as RF signals passing through the lead pins 17a from expanding toward the side wall of the package 14, and thus, resonance between the lead pins 17a and the side wall of the package 14 is much less likely to occur. Consequently, degradation of high-frequency characteristics caused by the resonance between the lead pins 17a and the side wall of the package 14 can be prevented more effectively.

[b] Second Embodiment

Described next is an optical module according to a second embodiment of the present invention. The optical module according to the second embodiment has the same configuration as that of the optical module according to the first embodiment, except for the locations of the ground patterns. Thus, in the second embodiment, the same reference signs are given to the same constituent elements as those in the first embodiment, and the detailed explanations thereof are omitted.

Figure 6:
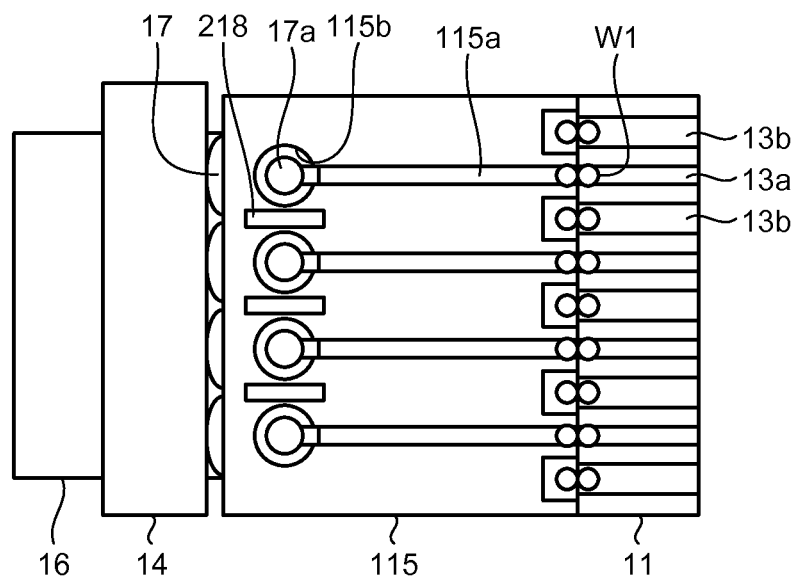
FIG. 6 is an enlarged top view illustrating an example of a connection part between a relay substrate and an FPC according to a second embodiment of the present invention.

FIG. 6 is an enlarged top view illustrating an example of a connection part between the relay substrate 115 and the FPC 16 according to the second embodiment. As illustrated in FIG. 6, the optical module according to the second embodiment includes ground patterns 218 each provided in a region, out of regions surrounding a first through hole 115b on the relay substrate 115, between lead pins 17a adjacent to each other. Specifically, each ground pattern 218 is provided in a region between lead pins 17a adjacent to each other such that it extends along a line that crosses a line connecting the adjacent lead pins 17a. The length of each ground pattern 218 is longer than the diameter of the lead pins 17a. This configuration divides the adjacent lead pins 17a from each other.

As described above, in the optical module according to the second embodiment, the ground patterns 218 are each provided in a region, out of the regions surrounding a first through hole 115b on the relay substrate 115, between lead pins 17a adjacent to each other. This configuration divides the adjacent lead pins 17a from each other, and prevents expansion of electric field distribution of the electric signals such as RF signals passing through the adjacent lead pins 17a. Consequently, crosstalk between the adjacent lead pins 17a can be reduced.

[c] Third Embodiment

Described next is an optical module according to a third embodiment of the present invention. The optical module according to the third embodiment has the same configuration as that of the optical module according to the first embodiment, except for the locations of the ground patterns. Thus, in the third embodiment, the same reference signs are given to the same constituent elements as those in the first embodiment, and the detailed explanations thereof are omitted.

Figure 7:
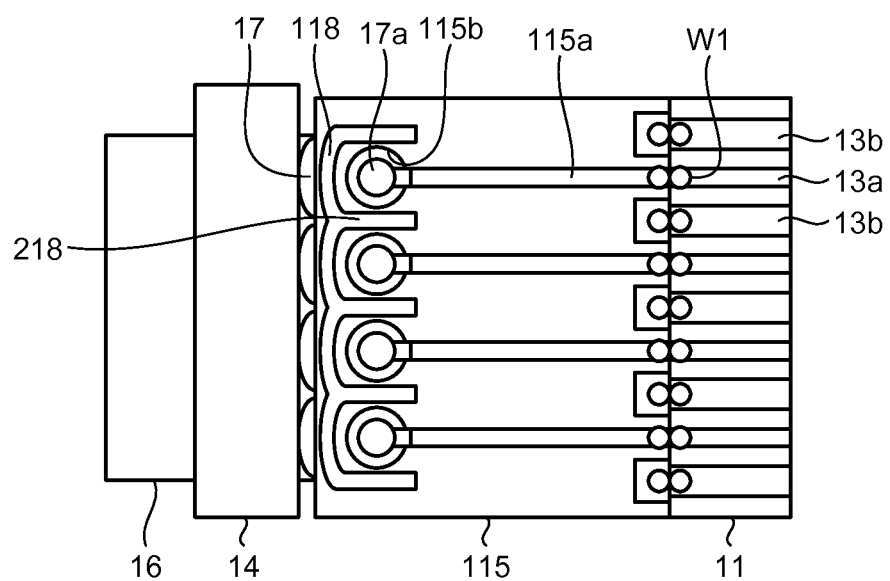
FIG. 7 is an enlarged top view illustrating an example of a connection part between a relay substrate and an FPC according to a third embodiment of the present invention.

FIG. 7 is an enlarged top view illustrating an example of a connection part between the relay substrate 115 and the FPC 16 according to the third embodiment. As illustrated in FIG. 7, in the optical module according to the third embodiment, the ground patterns 118 are each provided in a region, out of regions surrounding a first through hole 115b on the relay substrate 115, between a lead pin 17a and the side wall of the package 14. Ground patterns 118 adjacent to each other are joined continuously. The ground patterns 118 at the outermost ends of the ground patterns 118 that are joined continuously are bent to extend along the longitudinal direction of the relay substrate 115.

The ground patterns 218 are each provided in a region, out of regions surrounding a first through hole 115b on the relay substrate 115, between lead pins 17a adjacent to each other. An end of each ground pattern 218 is joined to a joint between ground patterns 118 adjacent to each other.

Although FIG. 7 illustrates an example in which ground patterns 118 adjacent to each other are joined continuously, and an end of each ground pattern 218 is joined to a joint between the adjacent ground patterns 118, the present disclosure is not limited to this. For example, the adjacent ground patterns 118 may be separated from each other, and the ground pattern 218 may be separated from the ground patterns 118.

As described above, in the optical module according to the third embodiment, the ground patterns 118 are each provided in a region, out of the regions surrounding a first through hole 115b on the relay substrate 115, between a lead pin 17a and the side wall of the package 14. This configuration prevents electric field distribution of the electric signals such as RF signals passing through the lead pins 17a from expanding toward the side wall of the package 14, and thus, resonance between the lead pins 17a and the side wall of the package 14 is much less likely to occur. In the optical module according to the third embodiment, the ground patterns 218 are each provided in a region, out of the regions surrounding a first through hole 115b on the relay substrate 115, between the lead pins 17a adjacent to each other. This configuration divides the adjacent lead pins 17a from each other, and thus prevents expansion of electric field distribution of the electric signals such as RF signals passing through the lead pins 17a adjacent to each other. Consequently, degradation of high-frequency characteristics caused by the resonance between the lead pins 17a and the side wall of the package 14 can be prevented more effectively, and crosstalk between the adjacent lead pins 17a can be reduced.

[d] Fourth Embodiment

Described next is an optical module according to a fourth embodiment of the present invention. The optical module according to the fourth embodiment has the same configuration as that of the optical module according to the third embodiment, except for second through holes on the relay substrate 115. Thus, in the fourth embodiment, the same reference signs are given to the same constituent elements as those in the third embodiment, and the detailed explanations thereof are omitted.

Figure 8:
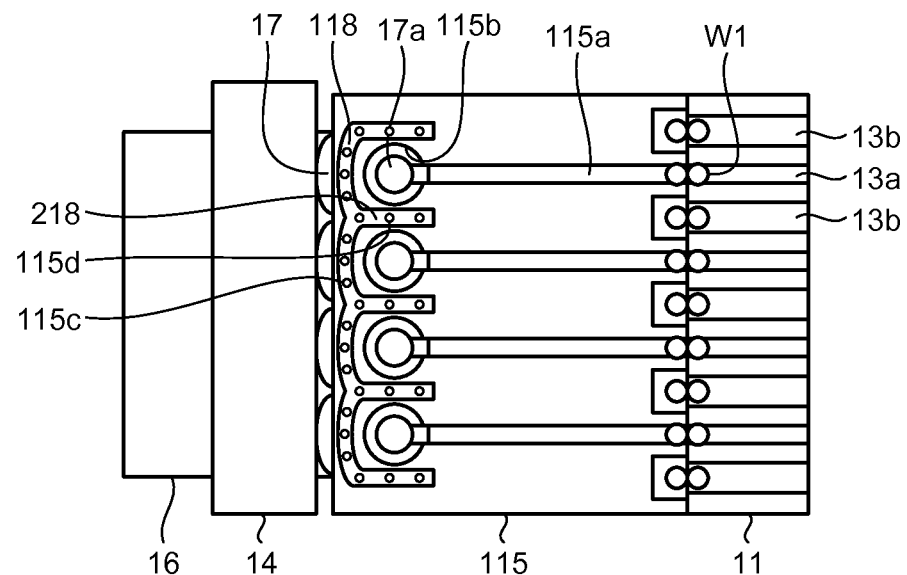
FIG. 8 is an enlarged top view illustrating an example of a connection part between a relay substrate and an FPC according to a fourth embodiment of the present invention.

FIG. 8 is an enlarged top view illustrating an example of a connection part between the relay substrate 115 and the FPC 16 according to the fourth embodiment. As illustrated in FIG. 8, in the optical module according to the fourth embodiment, the relay substrate 115 has second through holes 115c that electrically connect the ground patterns 118 and a ground layer provided inside the relay substrate 115. The relay substrate 115 also has second through holes 115d that electrically connect the ground patterns 218 and the ground layer provided inside the relay substrate 115.

As described above, in the optical module according to the fourth embodiment, the relay substrate 115 has, for example, the second through holes 115c that electrically connect the ground patterns 118 and the ground layer provided inside the relay substrate 115. Such second through holes 115c prevent expansion of electric field distribution inside the relay substrate 115. Consequently, inside the relay substrate 115, degradation of high-frequency characteristics caused by the resonance between the lead pins 17a and the side wall of the package 14 can be prevented more effectively, and crosstalk between lead pins 17a adjacent to each other can be reduced.

Although the fourth embodiment above describes an example in which the second through holes electrically connect the ground patterns and the ground layer provided inside the relay substrate 115, the present disclosure is not limited to this. For example, the second through holes may electrically connect the ground patterns and a ground layer provided on a surface of the relay substrate 115 opposite to the surface on which the ground patterns are provided.

[e] Fifth Embodiment

Described next is an optical module according to a fifth embodiment of the present invention. The optical module according to the fifth embodiment has the same configuration as that of the optical module according to the fourth embodiment, except for the shape of the ground patterns. Thus, in the fifth embodiment, the same reference signs are given to the same constituent elements as those in the fourth embodiment, and the detailed explanations thereof are omitted.

Figure 9:
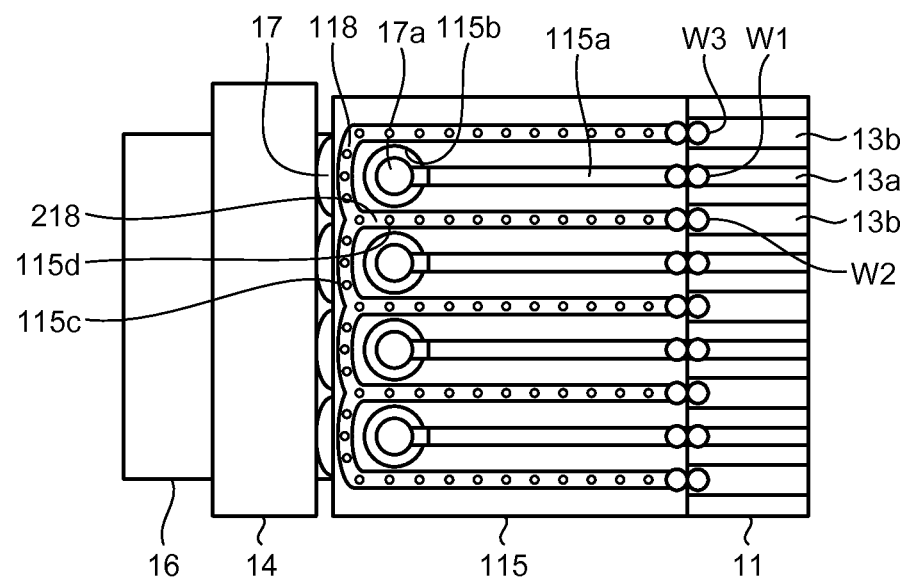
FIG. 9 is an enlarged top view illustrating an example of a connection part between a relay substrate and an FPC according to a fifth embodiment of the present invention.

FIG. 9 is an enlarged top view illustrating an example of a connection part between the relay substrate 115 and the FPC 16 according to the fifth embodiment. As illustrated in FIG. 9, in the optical module according to the fifth embodiment, the ground patterns 218 each extend along the signal line patterns 115a from a region, out of regions surrounding a first through hole 115b on the relay substrate 115, between lead pins 17a adjacent to each other. The ground patterns 218 are each connected to a ground electrode 13b on the crystal substrate 11 by a wire W2.

The ground patterns 118 at the outermost ends of the ground patterns 118 that are joined continuously are bent in the longitudinal direction of the relay substrate 115 to extend along the signal line patterns 115a, and are each connected to a ground electrode 13b on the crystal substrate 11 by a wire W3.

As described above, the optical module according to the fifth embodiment includes the crystal substrate 11. The crystal substrate 11 is a second substrate accommodated in the package 14. The crystal substrate 11 includes the signal electrodes 13a that are electrically connected to second ends of the signal line patterns 115a opposite to the first ends thereof, and the ground electrodes 13b disposed along the signal electrodes 13a. The ground patterns 218 each extend along the signal line patterns 115a from a region, out of the regions surrounding a first through hole 115b on the relay substrate 115, between lead pins 17a adjacent to each other, and are each electrically connected with a ground electrode 13b on the crystal substrate 11. This configuration can prevent expansion of electric field distribution of the electric signals such as RF signals passing through the adjacent lead pins 17a, and also prevent expansion of electric field distribution of the electric signals such as RF signals passing through signal line patterns 115a adjacent to each other. Consequently, crosstalk between the adjacent lead pins 17a and between the adjacent signal line patterns 115a can be reduced.

Application Example

Figure 10:
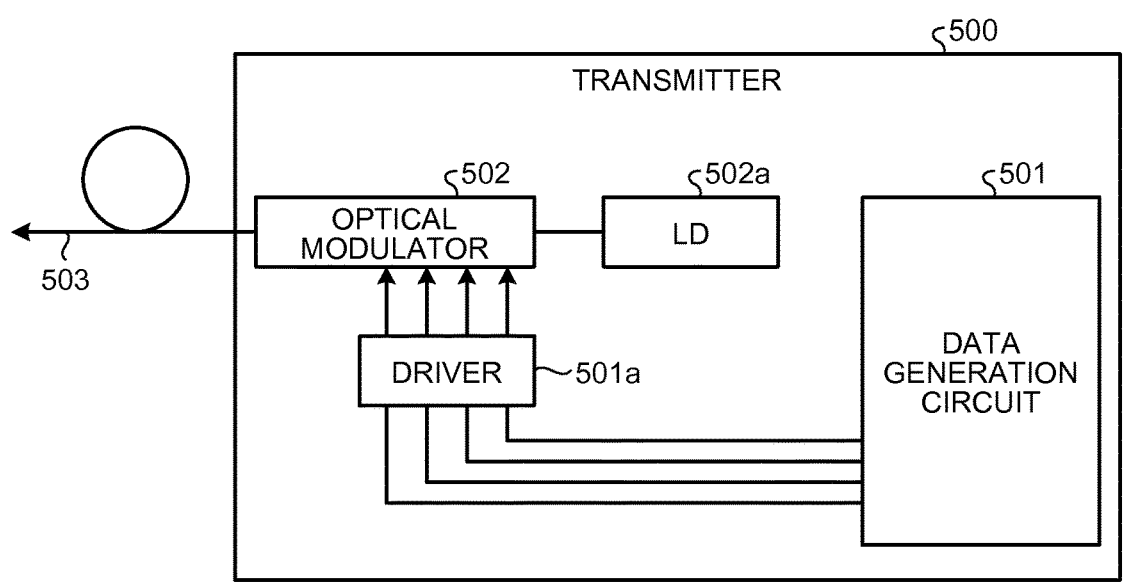
FIG. 10 is a diagram illustrating a configuration of a transmitter to which the optical module according to the first to fifth embodiments is installed.

An optical modulator using the optical module according to the first to fifth embodiments above can achieve high reliability and good mountability. Thus, such an optical modulator can be advantageously used in, for example, a transmitter. FIG. 10 is a diagram illustrating a configuration of a transmitter 500 to which the optical module according to the first to fifth embodiments above is mounted. As illustrated in FIG. 10, the transmitter 500 includes a data generation circuit 501, an optical modulator 502, and an optical fiber 503. The data generation circuit 501 includes a driver 501a, and the optical modulator 502 includes a laser diode (LD) 502a. These constituent units are connected to each other so that they can input and output various types of signals and data unidirectionally or bidirectionally. Data generated by the data generation circuit 501 is converted from an electric signal to an optical signal by the optical modulator 502, and transmitted to an external device via the optical fiber 503 as a transmission medium.

In particular, the optical module according to the first to fifth embodiments above can be advantageously used as an optical modulator that receives electric signals via a connection part between the relay substrate 115 and the FPC 16. Examples of such an optical modulator include an in-phase/quadrature (I/Q) optical modulator, a polarization multiplexing optical modulator, and an optical transceiver. The optical module according to the first to the fifth embodiments above is not limited to use in a transmitter, but may be used in a receiver.

Although individual configurations and operations are described in the respective embodiments, the optical module according to the first to fifth embodiments above may also include constituent elements that are typical to other modifications. The first to fifth embodiments may be combined with each other in such a manner that not only two embodiments but also more than three embodiments may be combined. For example, the relay substrate 115 in the optical module according to the first and the second embodiments may have, for example, the second through holes 115c described in the fourth embodiment. All the constituent elements described in the first to fifth embodiments above may be included in one optical module if they are compatible with each other.

The optical module according to an embodiment of the present invention can prevent degradation of high-frequency characteristics caused by resonance between the lead pins and a side wall of the package.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical module comprising:
   a package;
   a first substrate that is accommodated in the package, includes a signal line pattern that transmits an electric signal, extends toward a side wall of the package beyond a first end of the signal line pattern, and has a first through hole formed between the first end of the signal line pattern and the side wall of the package;
   a lead pin that is inserted into the first through hole in the first substrate and inputs the electric signal to the first end of the signal line pattern;
   a ground pattern that is provided in at least a part of regions surrounding the first through hole on the first substrate; and
   a second substrate that is accommodated in the package, and has a signal electrode electrically connected to a second end opposite to the first end of the signal line pattern and a ground electrode disposed along the signal electrode, wherein
   the ground pattern is provided in a first region, out of the regions surrounding the first through hole on the first substrate, between the lead pin and another lead pin that are adjacent to each other, extends along the signal line pattern from the first region, and is electrically connected to the ground electrode of the second substrate.
2. The optical module according to claim 1, wherein the ground pattern is further provided in a second region, out of the regions surrounding the first through hole on the first substrate, between the lead pin and the side wall of the package.

3. The optical module according to claim 1, wherein the first substrate has a second through hole that electrically connects the ground pattern with a ground layer provided inside the first substrate or with a ground layer provided on a surface of the first substrate opposite to a surface on which the ground pattern is provided.

* * * * *